(12) United States Patent
Spellane

(10) Patent No.: US 6,376,021 B1
(45) Date of Patent: Apr. 23, 2002

(54) HEAT TREATMENT OF POLYPHENYLENE OXIDE-COATED METAL

(75) Inventor: Peter J. Spellane, Ardsley-on-Hudson, NY (US)

(73) Assignee: Polymer Alloys LLC, New York, NY (US)

( * ) Notice: Subject to any disclaimer, the term of this patent is extended or adjusted under 35 U.S.C. 154(b) by 0 days.

(21) Appl. No.: 08/599,840

(22) Filed: Feb. 12, 1996

(51) Int. Cl.$^7$ .................................................. B05D 3/02
(52) U.S. Cl. ................................ 427/388.2; 427/388.5; 427/195; 428/457
(58) Field of Search ......................... 427/388.2, 388.5, 427/195, 386; 118/504, 505; 428/457

(56) References Cited

U.S. PATENT DOCUMENTS

| | | | |
|---|---|---|---|
| 3,455,736 A | * 7/1969 | Davis et al. | 117/218 |
| 3,471,587 A | * 10/1969 | Whittemore et al. | 260/823 |
| 3,907,613 A | * 9/1975 | Bures et al. | 148/315 |
| 4,480,073 A | * 10/1984 | Russo | 525/68 |
| 5,271,891 A | * 12/1993 | Gay et al. | 419/36 |

OTHER PUBLICATIONS

Chemical Abstracts, vol. 87, 119354e (1977).
Chemical Abstracts, vol. 102, 135103f (1985).
Chemical Abstracts, vol. 98, 109032m (1983).
Chemical Abstracts, vol. 84, 181695h (1976).
Chemical Abstracts, vol. 95, 188687t (1981).
Chemical Abstracts, vol. 86, 9201e (1977).
Derwent Patent Abstract No. 85–155887/26 (1985), abstracting Japanese Patent Publication No. 60/87,046 (May 1985).
Derwent Patent Abstract No. 92–162137/20 (1992), abstracting Japanese Patent Publication No. 04/86,254 (Mar. 1992).
Derwent Patent Abstract No. 91–204944/28 (1991), abstracting Japanese Patent Publication No. 03/130765 (Jun. 1991).
Derwent Patent Abstract No. 85–200155/33 (1985), abstracting Japanese Patent Publication No. 60/125640 (Jul. 1985).
Derwent Patent Abstract No. 64747S (1971), abstracting Japanese Patent Publication No. 1971/34,918 (Oct. 1971).

* cited by examiner

*Primary Examiner*—Bret Chen

(57) ABSTRACT

A metal surface is coated with a coating layer comprising substituted polyphenylene oxide (PPO), such as 2,6-dimethyl-1,4-phenylene oxide, forming a PPO-coated metal article and the PPO-coated metal article is then heat treated, for example, from above ambient temperature to about 200° C., to enhance the adhesion of the PPO to the metal surface and improve the corrosion protection for the coated metal article.

10 Claims, No Drawings

HEAT TREATMENT OF POLYPHENYLENE OXIDE-COATED METAL

BACKGROUND OF THE INVENTION

It is known in the prior art to coat metal surfaces with various phenylene oxide polymers to form coatings which provide some degree of corrosion protection to the metal surface.

Certain references suggest the use of electropolymerized polyphenylene oxides in corrosion resistant coatings including the following: M-C. Pham et al., Bull. Societe Chimique France 1985, 1169; M. Vijayan et al., Bull. Electrochemistry 1986, 2, 349; T. F. Otero et al., Makromol. Chem., Macromol. Symp. 1987, 8, 255; and S. Pitchumani et al., J. Electrochem. Soc. India 1990, 39, 211.

One approach that has been described utilizes the electrochemical deposition of various phenylene oxide polymers as coatings onto the metal by utilizing a solution containing the polymerizable phenol monomer(s). See, for example, Chemical Abstracts, Vol. 84, 181695h (1976) and Chemical Abstracts, Vol. 95, 188687t (1981).

An alternative approach to the foregoing electrochemical deposition techniques has relied upon the deposition of the prepolymerized PPO material onto the metal either from solution or as a powder coating:

In U.S. Pat. No. 3,455,736 to H. R. Davis et al., it is taught that certain types of PPO material are deficient in regard to their temperature or solvent resistance (see Col. 1, lines 35–47) and that such disadvantages can be remedied by the use of what is termed "certain linear or substantially linear" PPO materials. Such "selected polyphenyleneoxide oxide polymer" (see Col. 3, line 24) would, for example, not have alkyl group substitution on the arylene rings of the polymer and are formed from reaction of potassium p-chlorophenolate; and More recent U.S. Pat. No. 3,907,613 teaches the use of a "substituted" PPO material, namely, poly(2,6-dimethyl-1,4-phenylene oxide), to coat metal surfaces, in violation of the teachings of the above described '736 patent. This patent indicates (at Col. 1, lines 13–21) that PPO films on metal lose their adhesion upon drying and are therefore "unsuitable to create protective layers on metal" unless expensive treatments of the metal with a thin layer of copper or silver are performed. As alternative approaches to such an expensive approach, this patent proposes either: (1) that the metal surface be provided with an oxidized conversion surface layer (see Col. 1, lines 28–33), such as by heating the metal (see Col. 1, lines 59–60); (2) that the PPO resin be modified by the inclusion of other resins and/or softening agents (see Col. 1, lines 34–37); (3) that corrosion inhibitor(s) be included in the PPO resin layer (see Col. 1, lines 39–45); or (4) that a further coating of PPO be used on top of the initial layer (see Col. 1, lines 46–49).

SUMMARY OF THE INVENTION

The present invention relates to a process in which a metal surface is coated with a substituted polyphenylene oxide polymer, as a neat resin or as a component of a resin mixture, for the purpose of providing corrosion protection to the metal. The coated metal article is heated to enable a chemical reaction between the metal surface and the polyphenylene oxide resin. Heating enhances the polymer's adhesion to and protection of the metal.

DETAILED DESCRIPTION OF PREFERRED EMBODIMENTS

The present invention resides in the use of a substituted PPO coating on a metal article to corrosion protect that article and to the resulting coated metal article. In particular, the heat treatment of such a PPO coating is used to enhance the adhesion of the coating to the metal article and to improve the corrosion protection capability of such a coating.

Any type of metal article which would normally be prone to corrosion when exposed to environmental conditions can be used in the practice of the present invention. Metals which a person of ordinary skill in the art may select for practice of the present invention include carbon steel, stainless steel, aluminum, and other normally corrodible metals.

The "substituted PPO" material which is used to form the corrosion protection layer which is to be placed on the aforementioned article is also well known to persons of ordinary skill in the art and is a commercially available polymer product. The aryl rings contained in the polyphenylene oxide polymer are generally substituted with alkyl groups preferably at the 2- and 6-positions on the ring. Generally speaking, the amount of PPO that is used in the coating to be affixed to the metal article will range anywhere from about 1% by weight to substantially 100% by weight of the coating that is applied to the metal surface. It is within the contemplation of the present invention to admix the PPO polymer with other functional additives or standard coating resins which will remain in the coating. For example, silicon, epoxy resins, polyester resins, polystyrene resins and/or other known softening agents for PPO resins can be used. In addition, corrosion inhibitors or other functional additives can be selected for incorporation into the final PPO-containing coating.

In one embodiment of the present invention, the PPO resin can be dissolved in a suitable hydrocarbon solvent, such as toluene, heptane or hexane, can be applied as a liquid film to the metal article, can be allowed to dry either at ambient or elevated temperature. In another embodiment of the present invention, the PPO resin can be applied to the metal article using powder coating techniques that are well known to the person of ordinary skill in the art.

In accordance with the present invention, a heat treatment of the aforementioned PPO-containing coating is used in order to enhance the adhesion of the coating to the metal article and, possibly, by means of metal-polymer interaction, to thereby improve the corrosion resistance of the coated metal article as compared to an analogous coated metal article that has not been heat treated. In general, the heat treatment can range anywhere from above about room temperature up to about 200° C. It is preferred to have the heating to a temperature near the $T_g$ of the PPO resin, which is about 215° C.

The foregoing is further illustrated by the Examples which follow:

EXAMPLE 1

This example gives the result of a salt fog performance test (ASTM B117) which compares unpretreated cold rolled steel coated with a PPO-containing resin to the same steel coated with commercial chromate-containing epoxy resin primer. In each case, the primed steel was topcoated.

General Electric Noryl GFN2-111 brand resin was dissolved in toluene to form a 5% solids solution. Unpretreated steel coupons (code APR 10157, cut only unpolish, ACT Laboratories, Inc., Hillsdale, Mich. 49242-0735) were cleaned by immersion in acetone, followed by paper towel scrubbing with acetone or 2-butanone. Each coupon was bar-coated with ca 10 mL of the Noryl brand resin/toluene solution then dried in air at ambient temperature or at 210° C. for ten minutes in a forced air oven. A "positive control" steel coupon was coated with chromate-containing epoxy primer and topcoated; the "negative control" steel coupon received no primer coat but was topcoated.

Each primer-coated steel panel was topcoated with approximately 0.8 mil standard polyester, cured at 450° F. for twenty seconds. Panels were scribed vertically, trimmed of areas which had not been primed, taped at edges, and placed in the salt fog chamber. Coupons were evaluated after 7 days exposure. Visual rankings are made on a scale of 1 (best) to 5 (worst).

| Sample | Visual ranking | Blister Scribe | Blister Edge* | Blister Plane* |
|---|---|---|---|---|
| Positive control | 2 | no effect | few halo #8 | few med #8 |
| Noryl (210° C. cure) | 2 | no effect | no effect | med #8 |
| Noryl (RT cure) | 3 | no effect | med dense #8 | med #8 |
| Negative control | 3 | no effect | halo-dense #8 | med #8 |

*ASTM D 714-87 ("Standard Test Method for Evaluating Degree of Blistering of Paints"), in 1993 Annual Book of ASTM Standards, Section 6, Paints, Related Coatings & aromatics, Vol. 06.01, p. 121, descibes the meaning of the terms. "Med." stands for "medium". "Halo" indicates blistering was limited to the area near the edge of the coupon.

These data indicate that, in this salt fog test, Noryl resin cured at high temperature performed as well as commerical chromate-containing epoxy primer, cured at elevated temperature, on unpretreated cold rolled steel.

EXAMPLE 2

Analysis of General Electric Specialty Chemicals Blendex HPP 820 PPO resin. $^{13}C$ quantitative and attached proton test (APT) NMR data indicated the structure depicted below. Trace impurities were evident: the 4,4'-dimer of 2,6-dimethylphenol and di-n-butylamine, which was probably co-catalyst in the oxidative polymerization of the dimethylphenol, monomer.

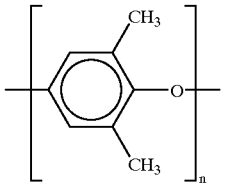

GPC determination of molecular weight for two samples of the GE BHPP 820 gave these results:
Sample 1 $M_w$=19600 $M_n$=12500 Mn/Mw =1.56
Sample 2 $M_w$=20000 $M_n$=12500 Mn/Mw =1.57.
GPC conditions: Phenogel MXL, 333×7.8 mm; solvent: THF 1 mL/min; detection UV 254 nm.

EXAMPLE 3

Neat PPO resin (BHPP 820 brand, GE Specialty Chemicals, Parkersburg, W.Va) was dissolved in toluene to form a 5% solids solution. Unpretreated steel (ACT Laboratories, Inc., Hillsdale, Mich. 49242-0735, product code APR 10157, cut only unpolish) was bar-coated with the PPO/toluene solution, then cured at 210° C. for ten minutes in a forced air oven and cooled slowly to room temperature before testing.

Open circuit potentials of coated steel coupons were measured with a Fluke 73 Multimeter (John Fluke Manufacturing Co. Inc., Everett, Wash.) relative to a saturated calomel electrode (SCE). Aqueous NaCl (5%) was the electrolyte solution. After five hours exposure to the electrolyte solution, open circuit potentials were measured. For comparison, the open circuit potentials of uncoated steel and galvanized steel samples were measured.

CRS/PPO (5 hrs) −0.4987 V v. SCE, (no rust)
Uncoated CRS (5 hrs) −0.7407 V v. SCE, (rusted)
Galvanized steel (2.5 hrs) −1.0619 V v. SCE, (no rust).

EXAMPLE 4

This Example gives the results of a salt-fog performance test (ASTM B117) in which samples were baked to the indicated temperatures immediately after being coated with PPO solution. The samples labelled "positive control" were coated with a chromate-containing epoxy primer and polyester topcoat. The "negative control" sample was coated with one coat of polyester topcoat only. The results indicate that steel coated with PPO to a dry film thickness of 0.25 mil and baked to a peak metal temperature above 500° F. performed as well as the positive control samples and showed less delamination of the coating at its bottom edge. These results also indicate that bake peak metal temperature is more critical than dry film thickness in anticorrosion effectiveness. The samples dried at room temperature performed no better than the negative control sample.

For salt-fog performance testing, similarly prepared solutions were coated on test panels, LTV (Independence, Ohio) CQ 0.01749 cold rolled steel (CRS) with Bonderite 902 pretreatment. To assis the dissolution of PPO solid in toluene, the solid-solvent mixtures were shaken with ceramic beads and were then filtered before application to steel. Approximately 20 mL aliquots of PPO solution were barcoated with a #34 wire wound rod, were cured to various peak metal temperatures which were monitored with temperature sensitive adhesive tape (Paper Thermometer Co., Greenfield, N.H.). The salt-fog samples were topcoated with CERAM-A-SIL polyester and were cured to 450° F. Samples were scribed to expose bare metal (one edge was exposed, top and side edges were taped) and were placed in salt fog corrosion chambers for 700 to 800 hours. At the conclusion of the tests, the test panels were removed, washed, dried and left to dry in air for one hour. Scribed areas and the bottom area of the panels were tape tested for adhesion. The samples were ranked in comparison to "positive control" coupons which had been primed with chromate-containing epoxy resin and topcoat and to "negative control" CRS which had been coated with topcoat only.

| Sample | Vis. ranking | Blister from Scribe | Edge Blister at Bottom Edge | Plane* | Delamination |
|---|---|---|---|---|---|
| positive control | 1 | 1–2 mm | 1 mm | excellent | 15 mm |
| positive control 2 | 1 | 1–3 mm w/delamination | 1–2 mm | med. #8 blister | 15 mm |
| PPO .25 mil 500F+ | 1 | 1–2 mm | 1 mm | few #8 blister | good |
| PPO .45 mil 500F | 2 | 2 mm w/delamination | 2 mm | med. #8 blister | 5 mm |
| PPO .25 mil 480F | 2 | 3–8 mm | 1–2 mm | med. #8 blister | 30 mm |
| PPO .3 mil 450F | 2 | 8 mm w/delamination | 2–4 mm | few #8 blister | 30 mm |
| PPO .2 mil 435F | 3 | 1–10 mm w/delamination | 1–2 mm | med. #8 blister | 5 mm |
| PPO .3 mil room temp | 5 | FAILS 100%; BLISTERS WITH RED RUST | | | |
| negative control | 5 | FAILS 100%; BLISTERS WITH RED RUST | | | |

*ASTM D 714-87 ("Standard Test Method for Evaluating Degree of Blistering of Paints") describes the meaning of the terms.
"Med." stands for "medium".

EXAMPLE 5

A fluidized bed reactor was constructed and charged with poly(2,6-dimethylphenylene oxide), "PPO", General Electric BHPP820 brand, General Electric Specialty Chemicals, Parkerburg, W.Va., and polymer coatings were applied to pieces of steel and aluminum in the following manner:

A glass tube, 7 inches long and 2 inch diameter and fitted with a glass frit at one end, was connected to a nitrogen gas line in such manner that the nitrogen gas at 5 psi was forced through the glass frit, creating an upward stream of gas. With gas pressure off, 32 grams of PPO, which had been sifted through a 90 micron sieve (Newark Wire Cloth, Newark, N.J.), were placed in the glass tube, on the frit. With nitrogen gas pressure applied, the PPO became fluid, forming a column about 5 inches high.

Unpretreated cold rolled steel coupons (ACT Laboratories, Hillsdale, Mich.) of dimension 1 cm ×10 cm were cleaned of oil with methylene chloride and acetone, were then heated with a propane torch until red hot, and were then immersed in the PPO powder. A thick white powder adhered to the metal.

In an alternative method, steel pieces were heated atop a thermostated plate to 350° C. then immersed in the fluidized PPO powder. A thin white powder adhered to the metal. One sample so prepared was placed in a vacuum oven at 238° C. for one hour after being coated in the fluidized bed reactor.

In another method, PPO powder was applied to a steel sample which lay on a 400° C. thermostated hot plate. Although the powder darkened, a strongly adhering film formed.

The foregoing Examples should not be construed in a limiting sense since they are intended to merely illustrate certain embodiments of the present invention. The scope of protection sought is set forth in the claims which follow.

I claim:

1. In a process in which the surface of a metal article is coated with a coating layer comprising alkyl-substituted polyphenylene oxide (PPO) forming a PPO-coated metal article for corrosion protection of the metal, wherein the improvement comprises heat treating the PPO-coated metal article in air to enhance the corrosion protection provided by the PPO to the metal surface in the PPO-coated metal article.

2. A process as claimed in claim 1 wherein the PPO is poly(2,6-dimethyl-1,4-phenylene oxide).

3. A process as claimed in claim 1 wherein the PPO-coated metal article is heated at from above ambient temperature to about 260° C.

4. A process as claimed in claim 1 wherein the coating layer is formed by solution coating.

5. A process as claimed in claim 1 wherein the coating layer is formed by powder coating.

6. A PPO-coated metal article formed by the process of claim 1.

7. A PPO-coated metal article formed by the process of claim 2.

8. A PPO-coated metal article formed by the process of claim 3.

9. A PPO-coated metal article formed by the process of claim 4.

10. A PPO-coated metal article formed by the process of claim 5.

* * * * *